Patented Oct. 21, 1941

2,259,895

UNITED STATES PATENT OFFICE 2,259,895

PROCESS FOR MANUFACTURE OF ALIPHATIC CARBOXYLIC ACID ANHYDRIDES

Franz Koenig, Walldorf, near Frankfort-on-the-Main, Germany, assignor, by mesne assignments, to Chemical Marketing Company Inc., New York, N. Y.

No Drawing. Application September 17, 1938, Serial No. 230,429. In Belgium October 9, 1937

8 Claims. (Cl. 260—546)

The present invention relates to the production of organic carboxylic acid anhydrides, such as acetic anhydride, propionic - acid - anhydride, butyric-acid-anhydride.

It is known, that in the oxidation of aldehydes the corresponding carboxylic acid anhydrides are formed over the intermediate existence of per-compounds. These anhydrides are obtained by known measures such as distillation in vacuo, whereby the anhydrides are preserved from the saponifying influence of the water formed at the oxidation. Generally metal salts, especially the acetates of copper, cobalt or manganese, are used in the dissolved or suspended form. The yields and the reactions velocity are very unsatisfying so that, a technical process is nearly impossible.

It is an object of my invention to provide, such catalysts as accelerate the reactions so that the process may be well practised.

My invention consists in carrying through the said process with catalysts to which stronger acids, or those acids which are able to form complex compounds, or other acidic substances are added. The catalysts to which these substances, according to my invention, are added are the salts of the metals with organic acids. I prefer to employ polyvalent metals salts and to use the free organic acids of the salt as solvent or suspending agent. The salts of copper, silver, cobalt, nickel, iron, chromium and the like are used, preferably in the presence of substances with large surface such as silica gel, active-carbon, cellulose. As strong acids I use sulphuric acids, alkali bisulfates, perchloric acid, phosphoric acids, acid phosphates, sulpho-acetic acid, benzene sulphonic acid, chlorinated carboxylic acid and so on.

In the same way, weaker acidic substances, which form strong acidic complex compounds by reactions with a corresponding carboxylic acids, such as boric acid, zinc chlorid, vanadium acid, molybdic acid and the like may be employed.

The effect obtainable by my invention is quite surprising. One would have supposed that in the presence of such strong acids, which are well known hydrating catalysts, the acetic anhydride formed would be hydrated to acetic acid. I know, it has already been proposed to add copper sulphate as waterbinding agent to the catalyst at the manufacture of anhydride from acetaldehyde. Tests however, have shown to me, that by using a catalyst which was obtained by adding sulphuric acid to a solution of copper acetate the yields and the velocity of reaction are much improved.

When carrying out my invention I prefer to introduce fresh aldehyde to the liquid containing the catalyst and to treat it with oxygen or oxygen containing gases at ordinary or elevated pressure. In that case I lead away heat of reaction in order to prevent the temperature of reaction rising too much.

I withdraw continually or periodically a part of this reaction liquid and isolate the anhydride by distillation in vacuo. The remainder of the liquid is returned into the cycle. In this way, the high reaction velocity of oxidation caused by the new catalysts, is well utilized. The reaction velocity can furthermore be improved by adding esters of the corresponding acids such as ethyl acetate, to the circulating liquid of the catalyst.

Example 1

In a stirring vessel, which is provided with a good cooling system and which enables the reaction liquid to circulate 30 parts of glacial acetic acid, 0.15 part of cobalt acetate and 0.2 part of copper acetate are introduced. At 44–45°, 34.5 kg. of acetaldehyde are treated with the equivalent quantity of oxygen, within 2½ hours. After one hour the reaction liquid contained 26% acetic anhydride, and from that time the liquid was removed gradually in the rate as acetaldehyde was introduced. 55% of the reacted acetaldehyde was transformed to acetic anhydride.

Example 2

In the same way as in Example 1 by using 0.15 part of cobalt acetate and 0.2 part copper sulphate within 2 hours, 17.6 parts of acetaldehyde entered into the reaction, whereby a yield of 52% acetic anhydride was obtained.

Example 3

I use 0.15 part cobalt acetate, 0.2 part copper acetate and 0.02 part sulphuric acid. Within one hour 17.5 parts of acetaldehyde are reacted with a yield in anhydride of 63%.

Example 4

I use 0.15 part of cobalt acetate, 0.2 part of copper acetate and 0.03 part of benzene sulphonic acid. Within one hour 18.8 kg. acetaldehyde are reacted, whereby 13.3 kg. acetic anhydride/per hour, are formed, i. e. a yield of 61%.

Example 5

When using 0.15 part cobalt acetate, 0.2 part copper acetate and 0.03 part of boric acid 18.2 parts of acetaldehyde were reacted per hour and 13.1 kg. acetic anhydride/per hour were formed, i. e. 61% of the theoretical amount.

Example 6

In a stirring vessel as in Example 1, 17 parts (by weight) of ethyl acetate are mixed with 0.15 part cobalt acetate and 0.2 part of copper sulphate. At 44–45° C. within 3½ hours a mixture of 64 parts of acetaldehyde and 43 parts of ethyl acetate with the equivalent quantity of oxygen are introduced into the reaction vessel. After 1 hour the reaction mixture had a content of 22.5% acetic anhydride and from this point it was removed just as the acetaldehyde diluted with ethyl acetate was introduced. 63% of the reacting acetaldehyde were transformed into acetic anhydride, which means a yield of 12 kg. acetic anhydride per hour. The reaction mixture had finally a content of 32% acetic anhydride.

Example 7

In a stirring vessel as in Example 1 to a solution of 30 parts of ethyl acetate, 0.15 part cobalt acetate, 0.1 part copper acetate and 0.03 part boric acid in 500 cm. glacial acetic acid pure acetaldehyde was introduced with the equivalent quantity of oxygen at a rate corresponding to the velocity of oxidation. 18.4 kg. acetaldehyde were reacted per hour and 15.4 kg. acetic anhydride were obtained, i. e. 72% of the theoretical amount. The reaction liquid had a content of 32% acetic anhydride, the reaction temperature was kept at 44–45° C.

Example 8

As in Example 1 in a mixture of 60 parts glacial acetic acid, 1 part cobalt acetate, 1 part copper acetate and 0.2 part zinc chloride, I reacted for 1¼ hours 56.4 parts of acetaldehyde with the equivalent quantity of oxygen. A yield of 73% of anhydride was obtained.

When using propionic, butyric aldehydes and the like instead of acetaldehyde the anhydrides of propionic and butyric acids respectively are obtained in a similar manner.

I prefer to use catalysts free from manganese. I have found the surprising fact, that manganese is not favourable and is even noxious to the formation of acetic anhydride, as may be seen from the following examples.

Example 9

As in Example 1 in a mixture of 50 parts ethyl acetate, 1 part manganese acetate, 1 part copper acetate and 0.2 part zinc chloride, 49 parts of acetaldehyde were reacted. The yield in acetic anhydride was only 24%.

Example 10

Using the same conditions and the same catalyst in Example 9 but without zinc chloride, 45.6 parts of acetaldehyde were reacted. I obtained 22% of acetic anhydride after 2½ hours.

The effect caused by the invention may be seen from the following table.

| Catalyst | Solvent | Time of oxidation, hours | Acetaldehyde reacted/kg. | Anhydrid obtained, kg. percent | Oxidation rate, kg./h. | |
|---|---|---|---|---|---|---|
| CuSO$_4$+Co-acetate | CH$_3$COOH | 2 | 29.1 | 17.9 | 52 | 8.9 |
| Do | do | 2 | 26.4 | 17.6 | 57 | 8.8 |
| Cu+Co-acetate | do | 2 | 29.0 | 17.2 | 51 | 8.6 |
| Do | do | 2.5 | 34.1 | 22.0 | 55 | 8.8 |
| Cu+Co-acetate H$_2$SO$_4$+C$_2$H$_5$OH | CH$_3$COOH | 1 | 17.5 | 12.8 | 63 | 12.8 |
| Cu+Co-acetate Benzene sulfonic acid | do | 1.5 | 28.3 | 20.0 | 61 | 13.3 |
| Cu+Co-acetate Boric acid | do | 1.6 | 29.2 | 20.5 | 61 | 13.1 |
| CuSO$_4$+Co-acetate | Ester | 3.5 | 58.1 | 42.5 | 63 | 12.2 |
| Cu+Co-acetate Boroacetic acid | Ester | 1.5 | 28.7 | 22.9 | 69 | 15.3 |
| Cu+Co-acetate Boroacetic acid | do | 1.6 | 29.4 | 24.7 | 72 | 15.4 |

I claim:

1. A process for the manufacture of the anhydride of a carboxylic acid comprising oxidizing an aliphatic aldehyde in the liquid state in the presence of oxygen-containing gases, of an acidic compound reacting as an acid stronger than said carboxylic acid, and of a salt of a polyvalent metal selected from the group consisting of copper, silver, cobalt, nickel, iron and chromium and of the carboxylic acid corresponding to said anhydride.

2. A process for the manufacture of the anhydride of a carboxylic acid comprising oxidizing an aliphatic aldehyde in the liquid state with oxygen in the presence of an acidic compound reacting as an acid stronger than said carboxylic acid and of a salt of a polyvalent metal selected from the group consisting of copper, silver, cobalt, nickel, iron and chromium and of the carboxylic acid corresponding to said anhydride.

3. In the process for the manufacture of the anhydride of a carboxylic acid involving oxidizing an aliphatic aldehyde in a liquid reaction mass in the presence of oxygen-containing gases and of a polyvalent metal selected from the group consisting of copper, silver, cobalt, nickel, iron and chromium, the improvement which comprises conducting said oxidation in the presence of an acidic compound reacting as an acid stronger than said carboxylic acid, whereby said anhydride is produced with a yield and at a velocity of reaction greater than the yield and the velocity of reaction in the absence of said acidic compound.

4. In the process for the manufacture of the anhydride of carboxylic acid involving oxidation of an aliphatic aldehyde by passing oxygen-containing gases through a liquid reaction mass containing aliphatic aldehyde and a salt of a polyvalent metal adapted to catalyze said oxidation, the improvement which comprises adding to said reaction mass an acidic compound reacting as an acid stronger than said carboxylic acid whereby said anhydride is produced with an increased yield and at an increased velocity of reaction.

5. In the process for the manufacture of the anhydride of carboxylic acid involving oxidation of an aliphatic aldehyde in a liquid reaction mass in the presence of oxygen-containing gases and a carboxylate of a polyvalent metal adapted to catalyze said oxidation, the improvement which comprises maintaining in the liquid reaction mass an acidic compound reacting as an acid stronger than said carboxylic acid whereby said anhydride is produced with increased yield and at increased velocity of reaction.

6. Process for manufacture of acetic anhydride comprising treating acetaldehyde dissolved in acetic acid with oxygen in the presence of copper acetate and of a compound reacting as an acid stronger than acetic acid.

7. Process for manufacture of acetic anhydride comprising treating acetaldehyde dissolved in acetic acid with oxygen in the presence of cobalt acetate and of a compound reacting as an acid stronger than acetic acid.

8. Process for manufacture of acetic anhydride comprising treating acetaldehyde dissolved in acetic acid with oxygen in the presence of copper acetate and cobalt acetate and of a strong acid compound reacting as an acid stronger than acetic acid.

FRANZ KOENIG.